United States Patent
Tarr (10) Patent No.: US 12,237,757 B2
(45) Date of Patent: Feb. 25, 2025

(54) HEATSINK FOR A MIXER

(71) Applicant: Haier US Appliance Solutions, Inc., Wilmington, DE (US)

(72) Inventor: Ronald Scott Tarr, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 291 days.

(21) Appl. No.: 17/839,903

(22) Filed: Jun. 14, 2022

(65) Prior Publication Data
US 2023/0402902 A1 Dec. 14, 2023

(51) Int. Cl.
*H02K 9/22* (2006.01)
*A47J 43/08* (2006.01)
*H02K 9/06* (2006.01)

(52) U.S. Cl.
CPC ............ *H02K 9/227* (2021.01); *A47J 43/082* (2013.01); *H02K 9/06* (2013.01)

(58) Field of Classification Search
CPC ........ F16C 19/525; F16C 11/04; F16C 37/00; F16C 41/004; F16C 2380/26; H02K 9/227; H02K 9/06; H02K 7/145; H02K 7/003; H02K 9/22; H02K 9/223; H02K 9/00; H02K 9/225; A47J 43/082

USPC .......................................................... 310/52
See application file for complete search history.

(56) References Cited

U.S. PATENT DOCUMENTS

| | | | |
|---|---|---|---|
| 7,614,779 B2 * | 11/2009 | Ta | A47J 43/044 366/98 |
| 9,331,552 B2 | 5/2016 | Fedoseyev et al. | |
| 9,467,030 B2 | 10/2016 | Camilleri et al. | |
| 2008/0116838 A1 * | 5/2008 | Hattori | F04B 39/121 318/722 |
| 2014/0368064 A1 * | 12/2014 | Fedoseyev | H02K 9/225 310/54 |

FOREIGN PATENT DOCUMENTS

| | | | |
|---|---|---|---|
| EP | 1768234 | * | 3/2007 |
| JP | 2011205894 | * | 10/2011 |
| KR | 101981661 B1 | | 5/2019 |
| WO | WO2020177415 A1 | | 9/2020 |

* cited by examiner

*Primary Examiner* — Ahmed Elnakib
(74) *Attorney, Agent, or Firm* — Dority & Manning, P.A.

(57) ABSTRACT

A stand mixer includes an outer casing and a mixing motor disposed within the outer casing. A motor shaft is coupled to the mixing motor such that the motor shaft is rotatable by the mixing motor. A heatsink is mounted on the motor shaft such that the heatsink is in thermal communication with the motor shaft.

15 Claims, 10 Drawing Sheets

HEATSINK FOR A MIXER

FIELD OF THE INVENTION

The present disclosure relates generally to heatsinks for cooling for motors, such as motors for stand mixers.

BACKGROUND OF THE INVENTION

Stand mixers generally include a motor for driving the mixing shaft. The motors in the most powerful mixers are typically a brushed DC motors using permanent magnets. In operation, the motor produces heat which must be dissipated to ensure efficient operation of the mixer. Known cooling methods dissipate this heat employing fans connected to and rotating with the motor shaft to move air across the motor. In high torque operations, the motor produces the most heat while rotating slowly. Unfortunately, the correspondingly slow rotation of the fan is inefficient at dissipating the heat from the motor. Since the heat is generated in the windings of a brushed DC motor and the windings in are on the rotor, the rotor itself gets hot. However, cooling an internally mounted rotor by blowing air over the outside of the motor is an inefficient cooling method. Thus, a cooling fan can be ineffective at cooling the motor.

BRIEF DESCRIPTION OF THE INVENTION

The present subject matter provides mixer with a heatsink mounted on and in thermal communication with the motor shaft. Advantageously, the heatsink is effective without regard to the speed of the rotation of the motor shaft. Aspects and advantages of the invention will be set forth in part in the following description, may be apparent from the description, or may be learned through practice of the invention.

In one example aspect, a stand mixer includes an outer casing. A mixing motor disposed within the outer casing. A motor is shaft coupled to the mixing motor such that the motor shaft is rotatable by the mixing motor. A heatsink is mounted on the motor shaft such that the heatsink is in thermal communication with the motor shaft. A fan disposed within the outer casing and separate from the heatsink, the fan is operable to generate airflow over one or both of the mixing motor and the heatsink.

In another example aspect, a method of cooling a stand mixer is disclosed. The stand mixer includes a mixing motor disposed within an outer casing, a motor shaft coupled to the mixing motor such that the motor shaft is rotatable by the mixing motor, a heatsink mounted on the motor shaft such that the heatsink is in thermal communication with the motor shaft. The method includes operating the mixing motor and thereby rotating the motor shaft and the heatsink. The heatsink dissipates the heat produce by the operation of the motor into ambient air.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

Figure 1:
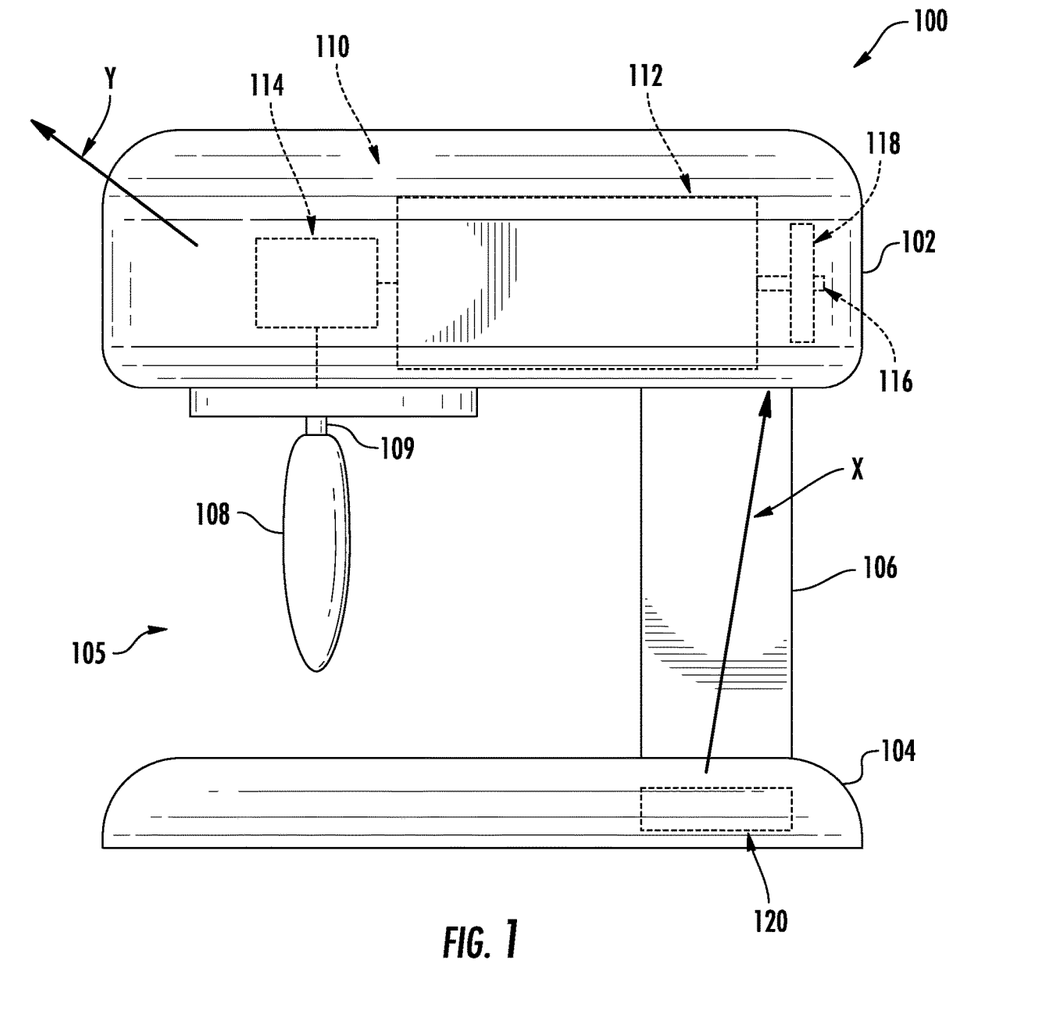
FIG. 1 provides a side, elevation view of a stand mixer according to an example embodiment of the present subject matter.
Figure 2:
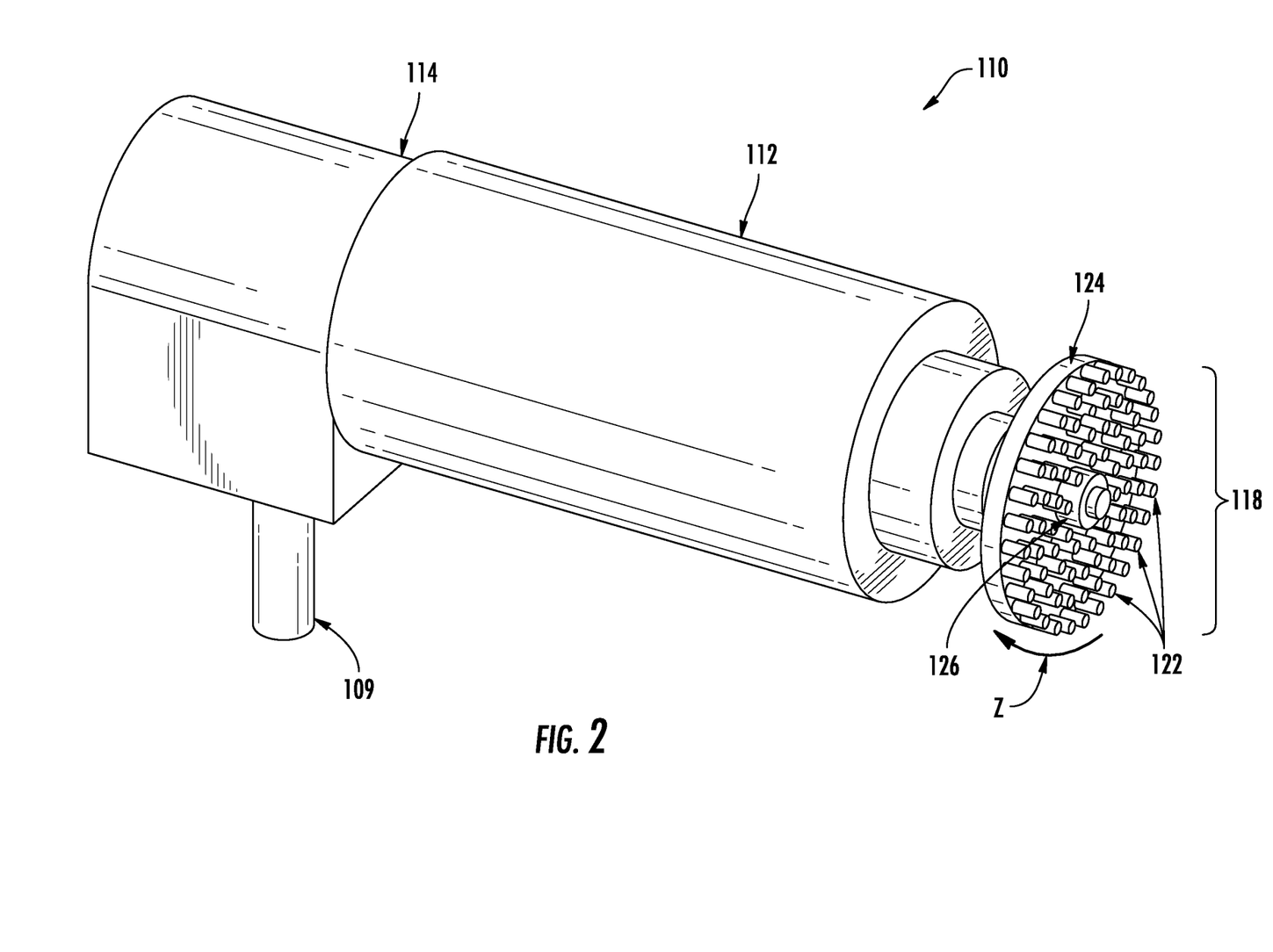
FIG. 2 is a rear, side perspective view of a drivetrain and heatsink of the example stand mixer of FIG. 1.
Figure 3:
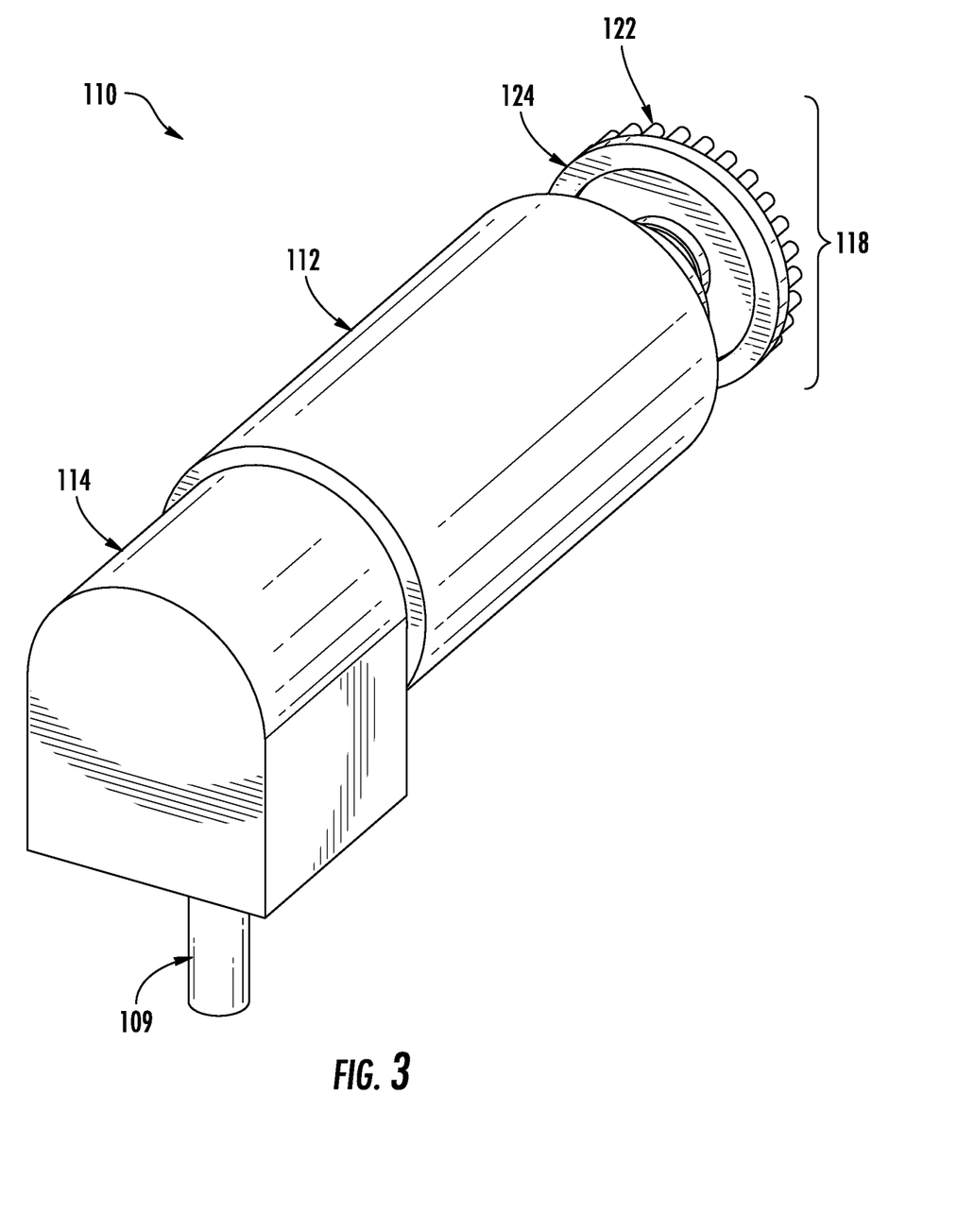
FIG. 3 is a front, side perspective view of the drivetrain and heatsink of the example stand mixer of FIG. 1.
Figure 4:
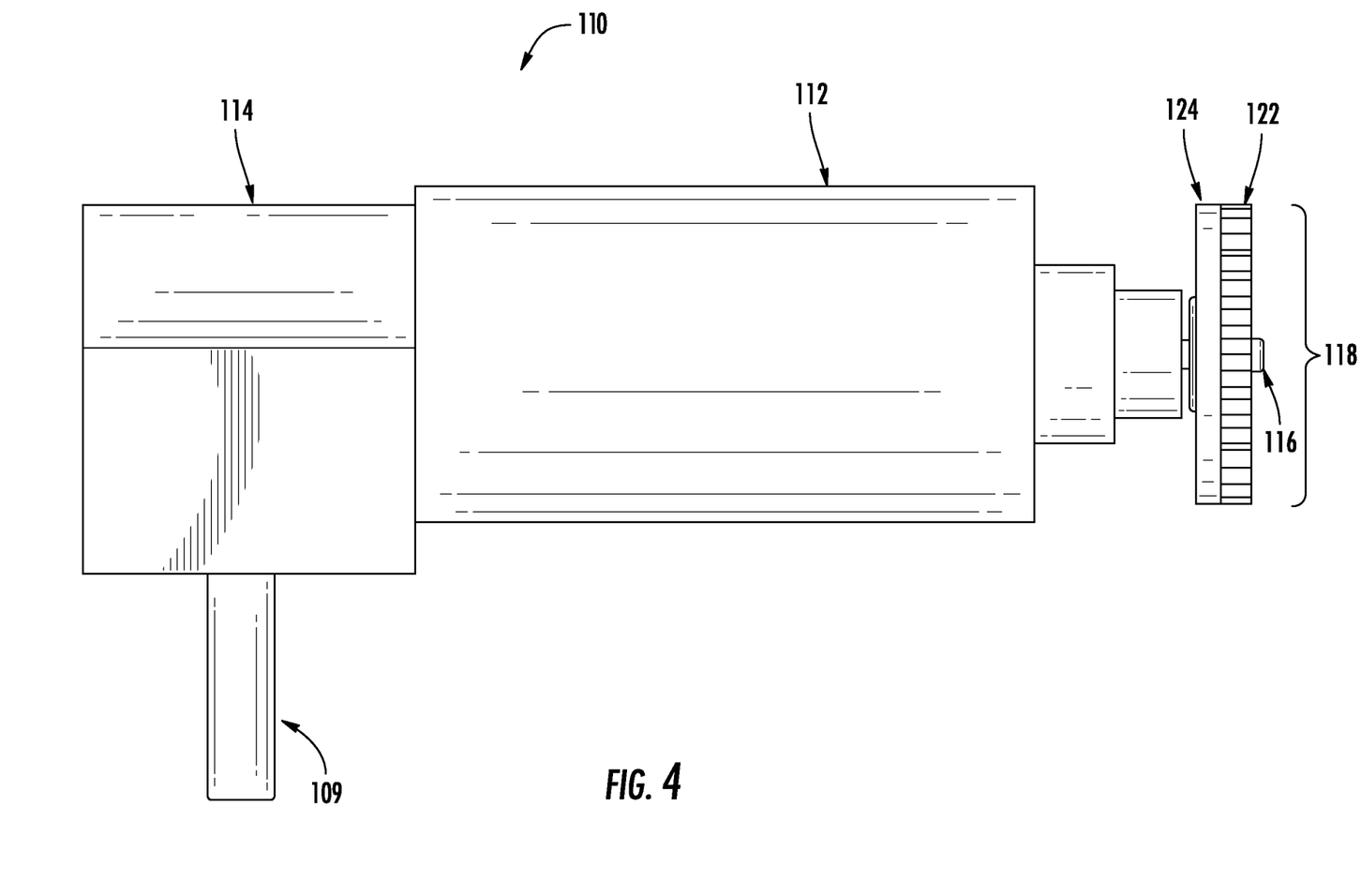
FIG. 4 is a side view of the drivetrain and heatsink of the example stand mixer of FIG. 1.
Figure 5:
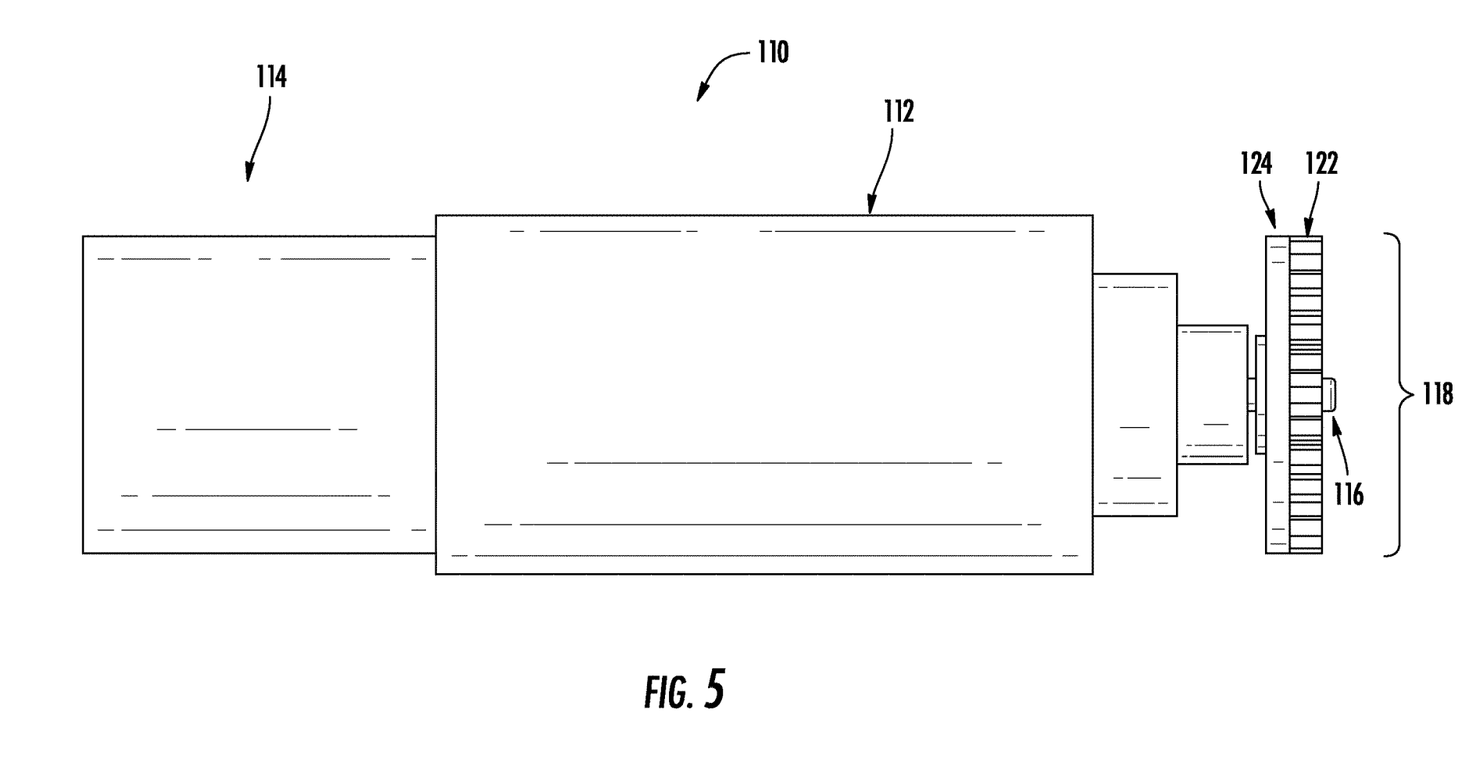
FIG. 5 is a top view of the drivetrain and heatsink of the example stand mixer of FIG. 1.
Figure 6:
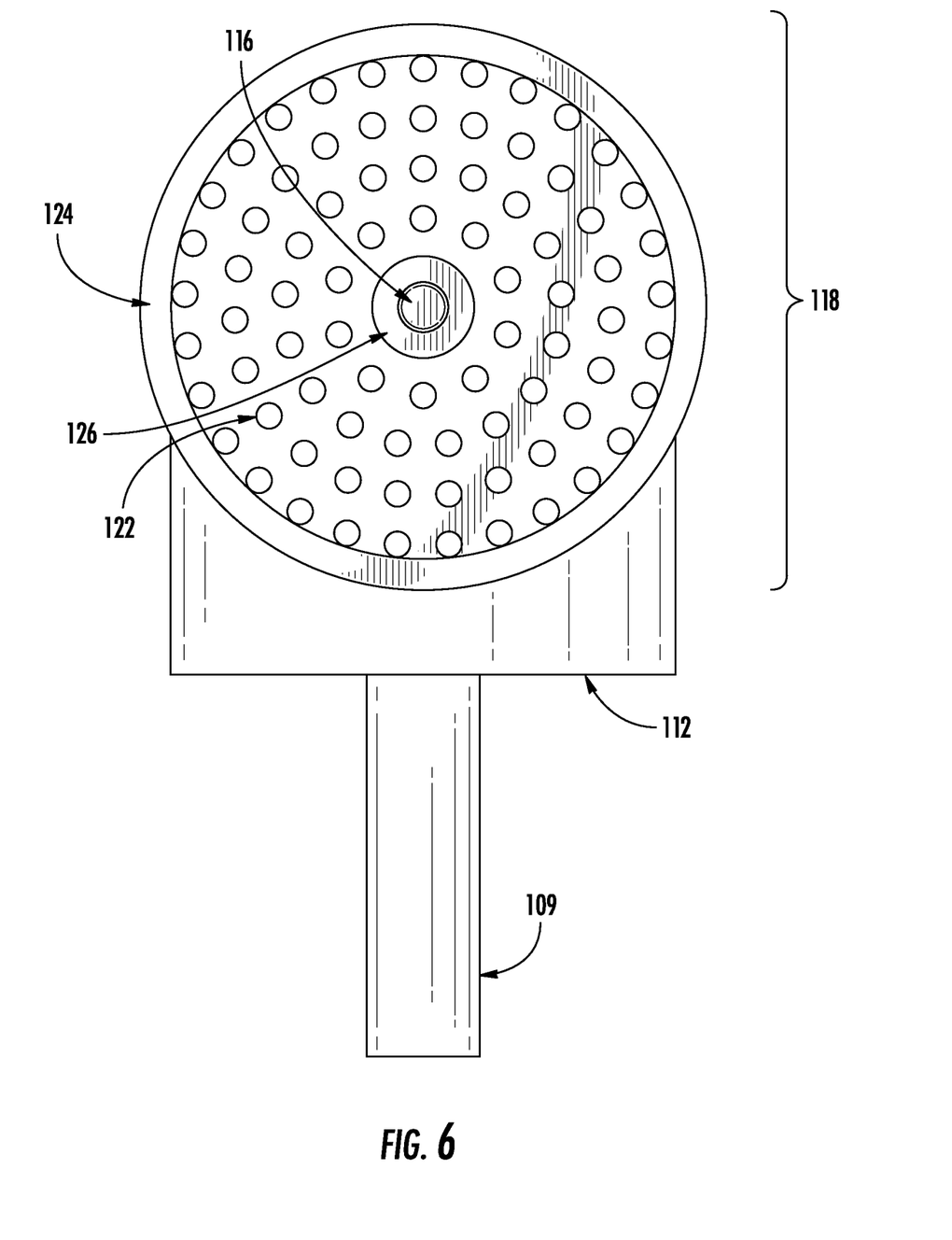
FIG. 6 is a rear view of the drivetrain and heatsink of the example stand mixer of FIG. 1.
Figure 7A:
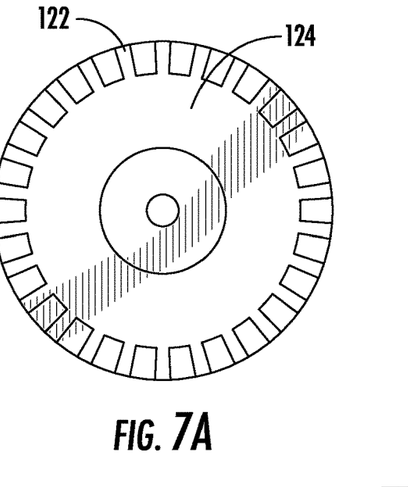
FIG. 7a is a front view of an exemplary heatsink.
Figure 7B:
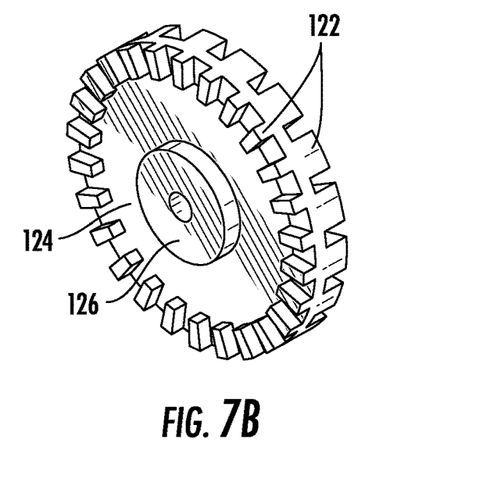
FIG. 7b is a front, side perspective view of an exemplary heatsink.
Figure 7C:
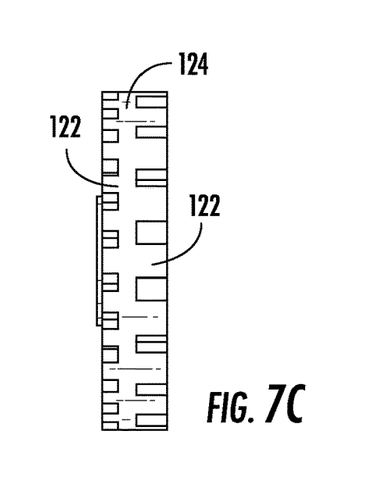
FIG. 7c is a side view of an exemplary heatsink.
Figure 7D:
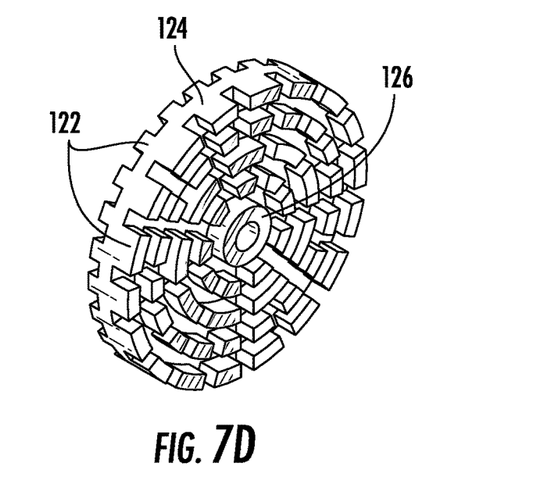
FIG. 7d is a rear, side perspective view of an exemplary heatsink.
Figure 7E:
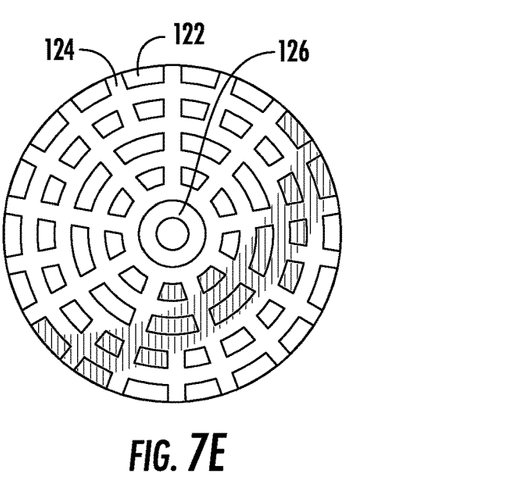
FIG. 7e is a rear view of an exemplary heatsink.
Figure 8A:
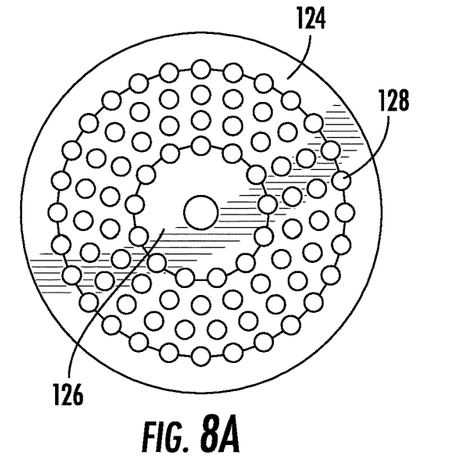
FIG. 8a is a front view of an exemplary heatsink.
Figure 8B:
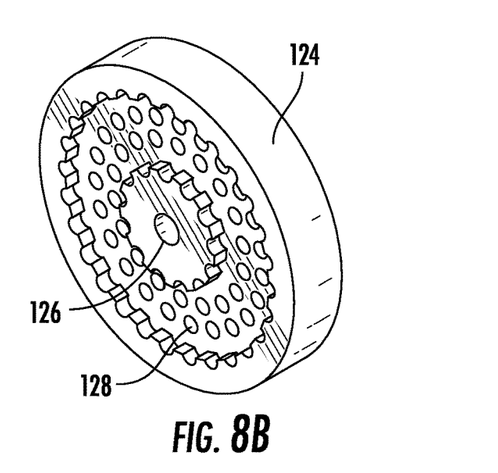
FIG. 8b is a front, side perspective view of an exemplary heatsink.
Figure 8C:
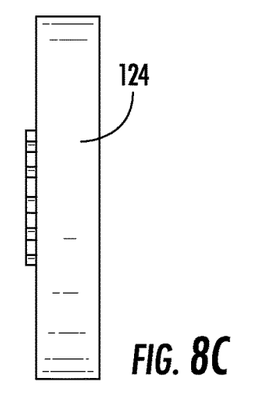
FIG. 8c is a side view of an exemplary heatsink.
Figure 8D:
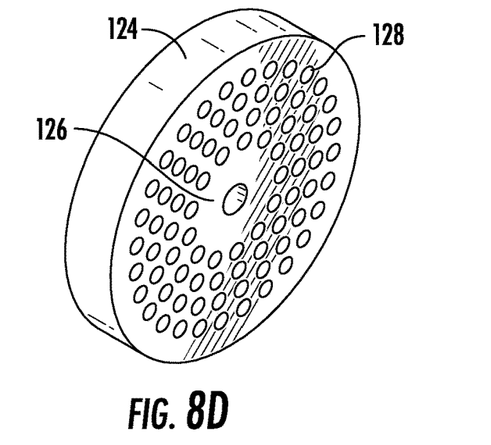
FIG. 8d is a rear, side perspective view of an exemplary heatsink.
Figure 8E:
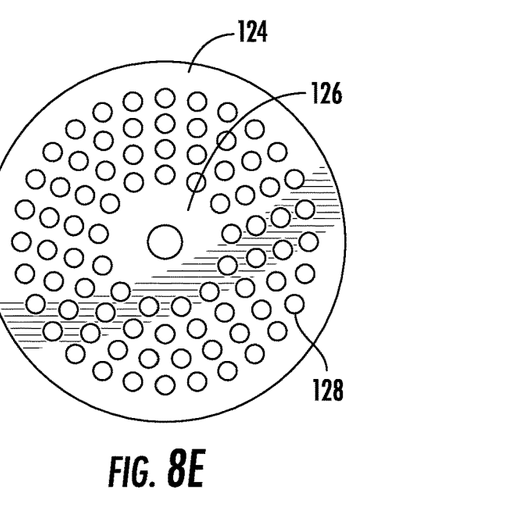
FIG. 8e is a rear view of an exemplary heatsink.
Figure 9A:
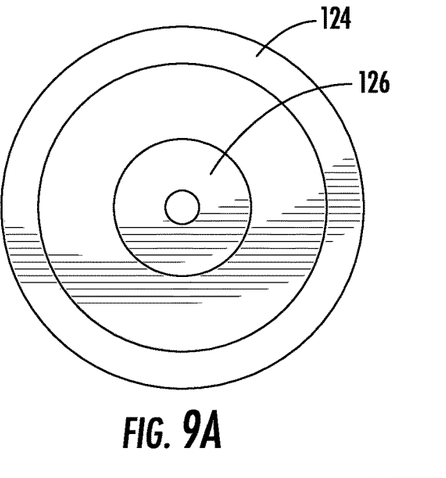
FIG. 9a is a front view of an exemplary heatsink.
Figure 9B:
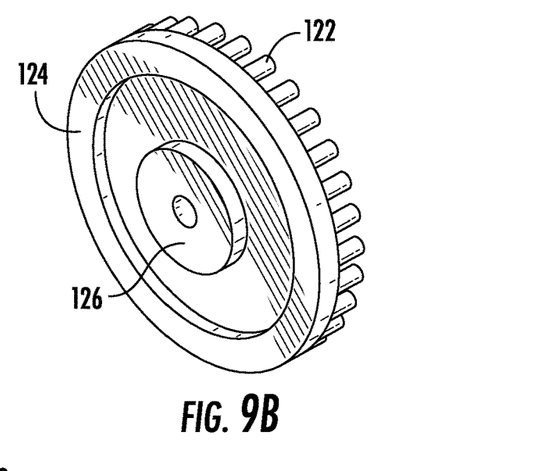
FIG. 9b is a front, side perspective view of an exemplary heatsink.
Figure 9C:
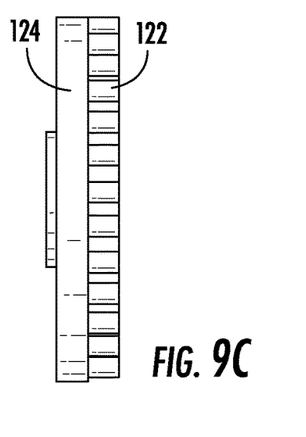
FIG. 9c is a side view of an exemplary heatsink.
Figure 9D:
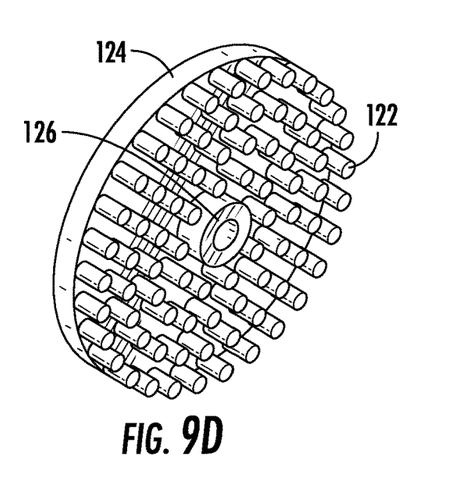
FIG. 9d is a rear, side perspective view of an exemplary heatsink.
Figure 9E:
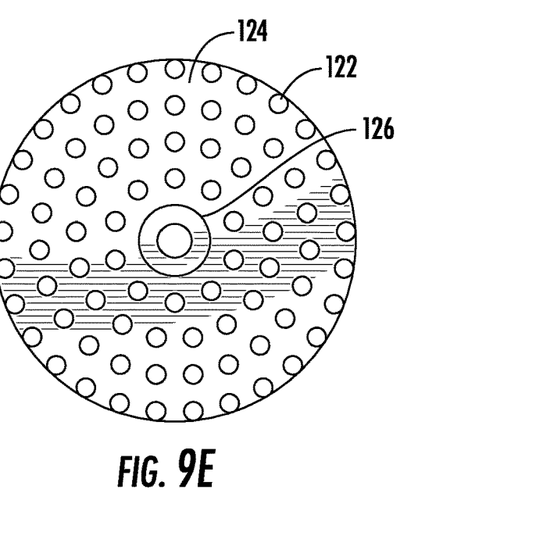
FIG. 9e is a rear view of an exemplary heatsink.
Figure 10A:
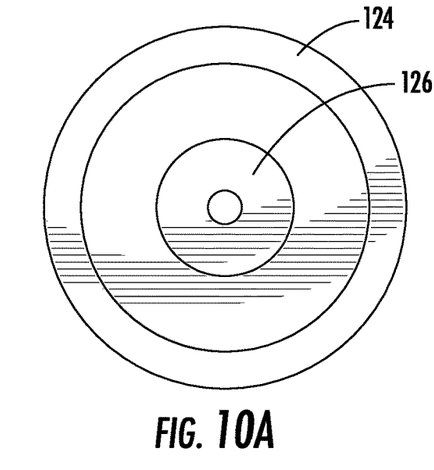
FIG. 10a is a front view of an exemplary heatsink.
Figure 10B:
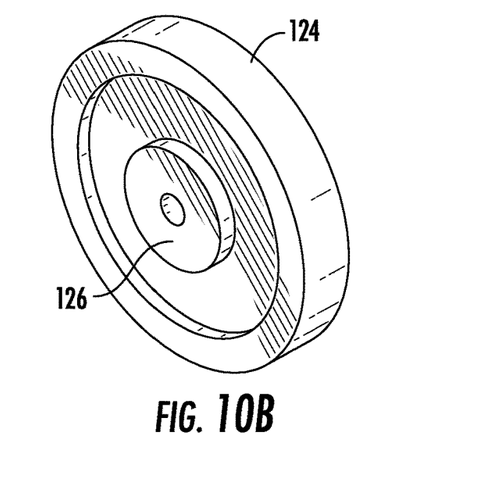
FIG. 10b is a front, side perspective view of an exemplary heatsink.
Figure 10C:
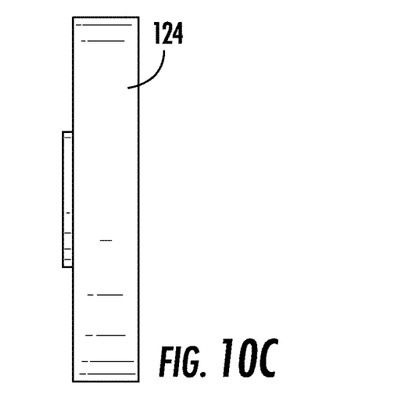
FIG. 10c is a side view of an exemplary heatsink.
Figure 10D:
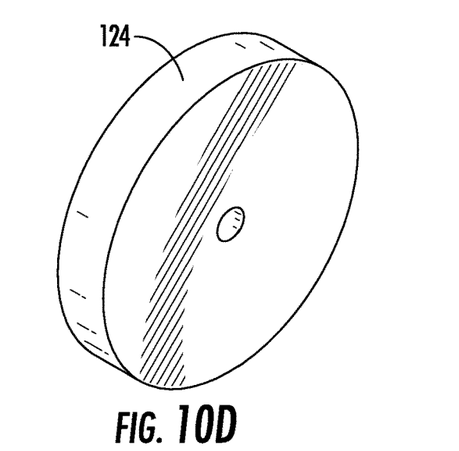
FIG. 10d is a rear, side perspective view of an exemplary heatsink.
Figure 10E:
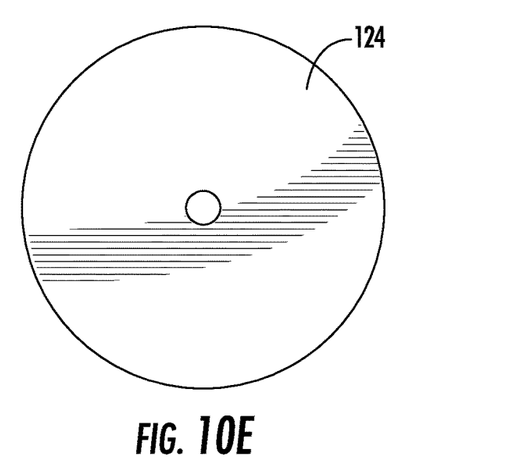
FIG. 10e is a rear view of an exemplary heatsink.

FIG. 1 provides a side, elevation view of a stand mixer 100 according to an example embodiment of the present subject matter. It will be understood that stand mixer 100 is provided by way of example only and that the present subject matter may be used in or with any suitable stand mixer in alternative example embodiments.

Stand mixer 100 includes a head 102, a base 104, and a post 106, which house various mechanical and/or electrical components of the stand mixer 100, and thus may also be collectively referred to herein as an outer casing. For example, as shown in FIG. 1, a motor 112, a gear box 114, and a heatsink 118 may be disposed within head 102. Base 104 may support head 102, and the fan 120 may be disposed within base 104 or may be disposed in the head 102. For example, head 102 may be pivotally mounted to base 104 on a post 106, e.g., that extends upwardly from base 104. Head 102 may be suspended over a mixing zone 105, within which a mixing bowl may be disposed.

A drivetrain 110 is disposed within head 102 and is configured for coupling motor 112 to a mixer shaft 109, e.g., such that mixer shaft 109 is rotatable with motor 112 via drivetrain 110. Drivetrain 110 may include gear box 114. Mixer shaft 109 may be positioned above mixing zone 105 on head 102, and an attachment 108, such as a beater, whisk, or hook, may be removably mounted to mixer shaft 109. Attachment 108 may rotate within a bowl (not shown) in mixing zone 105 to beat, whisk, knead, etc. material within the bowl, during operation of motor 112. The motor 112 may be operable to rotate mixer shaft 109 through the gear box 114. Opposite the gear box 114, the motor shaft 116 is coupled to the heatsink 118 such that the heatsink 118 is rotatable with the motor shaft 116.

Motor 112 may be a direct current (DC) motor in certain example embodiments. In alternative example embodiments, motor 112 may be an alternating current (AC) motor.

Heatsink 118 may be a passive heat exchanger that conducts heat away from or out of a device that produces heat and is in thermal communication with the heatsink 118, and heatsink 118 may reject the heat from the device to a fluid medium (such as air or water) in order to dissipate the heat. In the present disclosure, the heatsink 118 serves to reject the heat produced by the motor 112 during operation through the motor shaft 116 to the air in the outer casing and surroundings. To achieve high efficiency, the heat sink 118 of the present disclosure may be constructed of a material with high thermal conductivity. Thermal conductivity is a measure of the ability of a material to conduct heat from one area to another. A high thermal conductivity indicates that a material transfers heat at a high rate. Thermal conductivity is measured in units of watts per meter-kelvin (W/m·K).

In the present disclosure, useful materials are those with a thermal conductivity of over one hundred watts per meter-kelvin (100 W/m·K), preferably over two hundred watts per meter-kelvin (200 W/m·K). Examples of useful material for construction of the heatsink 118 include, but are not limited to, aluminum (239 W/m·K), copper (386 W/m·K), aluminum alloys, copper alloys, ceramics (such as aluminum nitride), gold (310 W/m·K), silver (419 W/m·K), silicon carbide, tungsten, graphite, zinc, and combinations thereof. In embodiments, the material for construction of the heatsink 118 is aluminum or an aluminum alloy due to excellent conductivity, low cost, and low density.

The ability of the heatsink 118 to dissipate the heat from the heat source is also related to a size and shape of heatsink 118, the nature of the coupling of the heatsink 118 to the heat source (e.g., the motor 112), and the rate of flow of the fluid (e.g., air) over the surface of the heatsink 118. The larger the cross-sectional area of the heatsink 118, the greater amount of heat the heatsink 118 can conduct away from the heat source. Moreover, the greater the surface area of the heatsink 118 in contact with fluid (e.g., the air) and the greater the flow of the fluid overt the surface of the heatsink 118 the greater the amount of heat the heatsink 118 can reject to the fluid. The heatsink 118 must be in, e.g., conductive, thermal communication with the heat source (e.g., the motor 112), but the degree of coupling will determine the efficiency of this thermal coupling. For example, the greater the surface area of the heatsink 118 in contact with the heat source, the greater the thermal communication. In addition, the way in which the heatsink 118 and the heat source are bonded may also affect thermal communication. For example, many common adhesives act as heat insulators and if used to bond the heatsink 118 to the heat source would serve to create poor thermal conductivity therebetween.

FIGS. 2-6, which show the drivetrain 110 and/or heatsink 118 of the stand mixer of FIG. 1, will be discussed in detail below in conjunction with example aspects of the present invention. The motor 112 may be coupled to the gear box 114 at a front end of the head 102. The gear box 114 may be coupled to the mixer shaft 109. The motor 112 may drive the mixer shaft 109 through the gear box 114. Opposite the gear box 114, the motor shaft 116 of the motor 112 may be coupled to the heatsink 118 by a collar or cuff 126 such that the heatsink 118 rotates with the motor shaft 116. Thus, e.g., cuff 126 may be positioned directly on and in contact with the motor shaft 116. The heatsink may have a base plate 124 extending radially outward from the motor shaft 116. The heatsink 118 may have a plurality of holes 128 projecting through the base plate. The heatsink 118 may have a plurality of protuberances 122 projecting axially from the base plate. The plurality of protuberances 122 may be distributed on one or both of radially and circumferentially on at least one surface of the base plate 124.

The protuberances 122 may have any shape and placement that results in an increased surface area exposed to the surrounding environment. In example embodiments, the protuberances 122 may project axially from the base plate 124 and may be distributed one or both of radially and circumferentially on at least one surface of the base plate 124. The protuberances 122 may be distributed one or both of radially and circumferentially on both surfaces of the base plate 124 (not shown). The protuberances 122 may be in the shape of pins, fins, splines, posts, or combinations thereof. In the alternative, the heatsink 118 may have any topography that increases exposure to and flow of air over the surface of the heatsink 118 when the heatsink 118 is rotating with the motor shaft 116. For example, the heatsink 118 may itself be a fan or in the shape of a fan to produce airflow when rotated to force air through and out of the head 102. In certain example embodiments, heatsink 118 may include no less than twenty (20) protuberances 122, no less than thirty (30) protuberances 122, no less than one hundred (100) protuberances 122, etc. In certain example embodiments, heatsink 118 may include no less than twenty (20) holes, no less than thirty (30) holes, no less than one hundred (100) holes, etc.

The cuff 126 of the base plate 124 may be adapted to receive and contact the motor shaft 116 to achieve an efficient thermal and physical communication therebetween. Cuff 126 may also be sized to facilitate conductive heat transfer from motor shaft 116 to cuff 126. For example, an axial length of cuff 126 may be no less than six millimeters (6 mm) and no greater than twenty-five millimeters (25 mm). As another example, a radial width of cuff 126 may be no less than three millimeters (3 mm) and no greater than sixteen millimeters (16 mm). Such sizing of cuff 126 may facilitate conductive heat transfer from motor shaft 116 to cuff 126. In operation, the heatsink 118 may rotate (Z) in conjunction with rotation of the motor shaft 116 when the motor 112 is in use. The protuberances 122 (discussed in detail below) may then be moved through the air increasing the dissipation of the heat from the motor shaft 116.

The communication between the heatsink 118 and the motor shaft 116 may be a direct physical contact or through a bonding material (not shown). The bonding material may be any material that affords a good thermal conductivity and produces a physical link between the heatsink 118 and the motor shaft 116 adequate to maintain the linkage during operation of the stand mixer 100. The bonding material may be solder (such as silver solder), a thermal paste, a potting compound, or a combination thereof.

The fan 120 may operate to drawn in air from outside the outer casing through openings or vents (not shown) in the base 104 or post 106 or both and expel air up the post 106 (e.g., along Path X) and into the head 102. This air may then flow over and around the heatsink 118 and motor 112 to increase the rate of dissipation of the heat generated by the motor 112. The air may then flow out of the head 102 (e.g., along Path Y) through additional openings or vents in the head 102.

In an example embodiment, the fan 120 may operate separately from the motor 112 so that the fan 120 may be operating when the motor 112 is not in operation, e.g., after mixing has been completed. Moreover, the speed of the fan 120 may not be controlled by the speed of the motor 112. For example, the fan 120 may be operating at a relatively high speed even when the motor 112 is running at a relatively slow speed.

The inside of the outer casing may also include non-moving or static features (not shown) around the heatsink 118 to improve airflow across the heat sink and also to provide airflow to other areas inside the outer casing of the stand mixer 100. Such non-moving features may act to make the separate fan 120 operated like a ducted fan. These non-moving features may include walls, fins, vents, ducts.

EXAMPLES

Heatsink in accordance with the present disclosure were made as shown in FIGS. 7-10. These heat sinks had the following characteristics:

TABLE 1

Characteristic of various exemplary heat sinks

| Heat Sink | Surface Area (in$^2$) | Volume (in$^3$) | Aluminum Mass (lbs) | Copper Mass (lbs) |
|---|---|---|---|---|
| FIG. 7 | 22.21 | 1.254 | 0.122 | 0.405 |
| FIG. 8 | 23.94 | 1.563 | 0.152 | 0.505 |
| FIG. 9 | 20.60 | 1.037 | 0.101 | 0.335 |
| FIG. 10 | 14.66 | 1.935 | 0.189 | 0.625 |

As Table 1 demonstrates, the choice of protuberances and material greatly effects the effective surface area, volume, and mass of the heat sink, thereby influencing its efficiency.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A stand mixer comprising:
   an outer casing comprising a head and a base;
   a mixing motor disposed within the head of the outer casing;
   a motor shaft coupled to the mixing motor such that the motor shaft is rotatable by the mixing motor;
   a heatsink mounted on the motor shaft such that the heatsink is in thermal communication with the motor shaft; and
   a fan disposed within the base of the outer casing and positioned to selectively flow air over one or both of the heatsink and the motor.

2. The stand mixer of claim 1, wherein the heatsink is mounted on the motor shaft such that the heatsink is rotatable with the motor shaft.

3. The stand mixer of claim 1, wherein the heatsink is constructed of a material selected from the group consisting of aluminum, copper, aluminum alloys, copper alloys, aluminum nitride, gold, silver, silicon carbide, tungsten, graphite, zinc, and combinations thereof.

4. The stand mixer of claim 1, wherein the heatsink comprises a base plate mounted on the motor shaft, the base plate extending radially outward from the motor shaft.

5. The stand mixer of claim 4, wherein the heatsink comprises a plurality of protuberances projecting axially from the base plate or a plurality of holes through the base plate.

6. The stand mixer of claim 5, wherein the plurality of protuberances are distributed one or both of radially and circumferentially on at least one surface of the base plate.

7. The stand mixer of claim 5, wherein each of the plurality of protuberances is in the shape of one or more of pins, fins, splines, and posts.

8. The stand mixer of claim 5, wherein the plurality of protuberances project from opposing surfaces of the base plate.

9. The stand mixer of claim 1, wherein the heatsink directly contacts the motor shaft such that the heatsink is in direct conductive thermal communication with the motor shaft.

10. The stand mixer of claim 1, further comprising a bonding material between the heatsink and the motor shaft.

11. The stand mixer of claim 10, wherein the bonding material is selected from the group consisting of a thermal paste, a potting compound, solder, or a combination thereof.

12. The stand mixer of claim 1, wherein the fan comprises a fan motor that is operable independently from the mixing motor.

13. A method of cooling a stand mixer that includes a mixing motor disposed within an outer casing, a motor shaft coupled to the mixing motor such that the motor shaft is rotatable by the mixing motor, a heatsink mounted on the motor shaft such that the heatsink is in thermal communication with the motor shaft, and a fan disposed within the outer casing and separate from the heatsink, the method comprising:
   operating the mixing motor and thereby rotating the motor shaft and the heatsink, wherein operating the fan comprises operating a fan motor separately from the mixing motor and heatsink, and wherein the heatsink dissipates heat produced by the operation of the motor into ambient air.

14. The method of claim 13, wherein the fan is operable to generate airflow over one or both of the mixing motor and the heatsink, the method further comprising:

operating the fan to generate the airflow over the heatsink.

15. The method of claim 13, wherein the heatsink is in the shape of a fan and operating the mixing motor and thereby rotating the motor shaft and the heatsink rotates the heatsink to generate airflow over the heatsink and out of the casing.

* * * * *